(12) United States Patent
Yagi et al.

(10) Patent No.: US 10,394,027 B2
(45) Date of Patent: Aug. 27, 2019

(54) HEAD-UP DISPLAY SYSTEM

(71) Applicant: Yazaki Corporation, Tokyo (JP)

(72) Inventors: Kenji Yagi, Shizuoka (JP); Kouichi Hotta, Nagano Pref. (JP); Hayato Nakamura, Nagano Pref. (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 57 days.

(21) Appl. No.: 15/594,044

(22) Filed: May 12, 2017

(65) Prior Publication Data

US 2017/0336633 A1 Nov. 23, 2017

(30) Foreign Application Priority Data

May 17, 2016 (JP) ................................. 2016-098796

(51) Int. Cl.
*G02B 27/14* (2006.01)
*G02B 27/01* (2006.01)
*B60K 35/00* (2006.01)

(52) U.S. Cl.
CPC .......... *G02B 27/0149* (2013.01); *B60K 35/00* (2013.01); *G02B 27/0101* (2013.01);
(Continued)

(58) Field of Classification Search
CPC .. G02B 27/0101; G02B 27/0075; G02B 6/34; G02B 26/101; G02B 27/0093;
(Continued)

(56) References Cited

U.S. PATENT DOCUMENTS

2014/0225811 A1 8/2014 Killguss et al.
2014/0368097 A1 12/2014 Yomogita
(Continued)

FOREIGN PATENT DOCUMENTS

CN 203688914 U 7/2014
CN 104428156 A 3/2015
(Continued)

OTHER PUBLICATIONS

Communication dated Oct. 19, 2017 from the European Patent Office in counterpart application No. 17171507.1.
(Continued)

*Primary Examiner* — Brandi N Thomas
(74) *Attorney, Agent, or Firm* — Sughrue Mion, PLLC

(57) ABSTRACT

A head-up display system includes an image-forming and projection device, a combiner, a housing, and a lid body. The lid body includes at least a first divided lid body and a second divided lid body which engage with each other at the time of covering an opening of the housing. The first divided lid body includes an optical path regulator that regulates an optical path of projection light of a display image projected from the image-forming and projection device in use of the combiner onto an inner side of the housing, and allows projection light, which is necessary for formation of the virtual image of the display image in the projection light of the display image, to pass through the optical path regulator. The second divided lid body includes a covering member that covers the optical path regulator at the time of covering the opening.

12 Claims, 8 Drawing Sheets

(52) U.S. Cl.
CPC  *B60K 2370/1529* (2019.05); *B60K 2370/334* (2019.05); *B60K 2370/682* (2019.05); *G02B 2027/015* (2013.01); *G02B 2027/0141* (2013.01); *G02B 2027/0156* (2013.01); *G02B 2027/0159* (2013.01)

(58) Field of Classification Search
CPC ............ G02B 27/0149; G02B 27/2214; G02B 27/225; G02B 6/02066; G02B 6/274; G02B 6/2766; G02B 2027/0154; G02B 27/0172; G02B 6/105; G02B 2027/0118; G02B 2027/0121; G02B 2027/019; H04L 29/06027; H04L 65/607; H04L 69/22; H04L 69/18; H04L 69/24; H04L 29/06; H04L 69/324; H04L 1/0061; H04L 1/245; H04L 69/03; H04L 7/0008; H04L 7/048; H04L 7/10; H04L 69/14; H04L 47/10; H04L 47/283; H04L 47/41
USPC .................................................. 359/619–633
See application file for complete search history.

(56) References Cited

U.S. PATENT DOCUMENTS

| | | | |
|---|---|---|---|
| 2015/0022898 A1* | 1/2015 | Yamakawa | B60K 35/00 359/633 |
| 2015/0055098 A1 | 2/2015 | Ishibashi | |
| 2015/0146299 A1 | 5/2015 | Koseki et al. | |
| 2016/0147066 A1* | 5/2016 | Ogasawara | G02B 27/0149 359/630 |
| 2017/0059866 A1 | 3/2017 | Henon et al. | |
| 2017/0082857 A1 | 3/2017 | Schoch et al. | |

FOREIGN PATENT DOCUMENTS

| | | |
|---|---|---|
| CN | 104656254 A | 5/2015 |
| CN | 104950441 A | 9/2015 |
| DE | 10 2014 106 498 A1 | 11/2015 |
| EP | 3 015 305 A1 | 5/2016 |
| JP | 11-072742 A | 3/1999 |
| JP | 2014-520698 A | 8/2014 |
| JP | 2015-6832 A | 1/2015 |
| KR | 10-2015-0117117 A | 10/2015 |
| WO | 2015/150569 A1 | 10/2015 |

OTHER PUBLICATIONS

Communication dated Apr. 3, 2019 from the State Intellectual Property Office of People's Republic of China in counterpart application No. 201710342971.8.

* cited by examiner

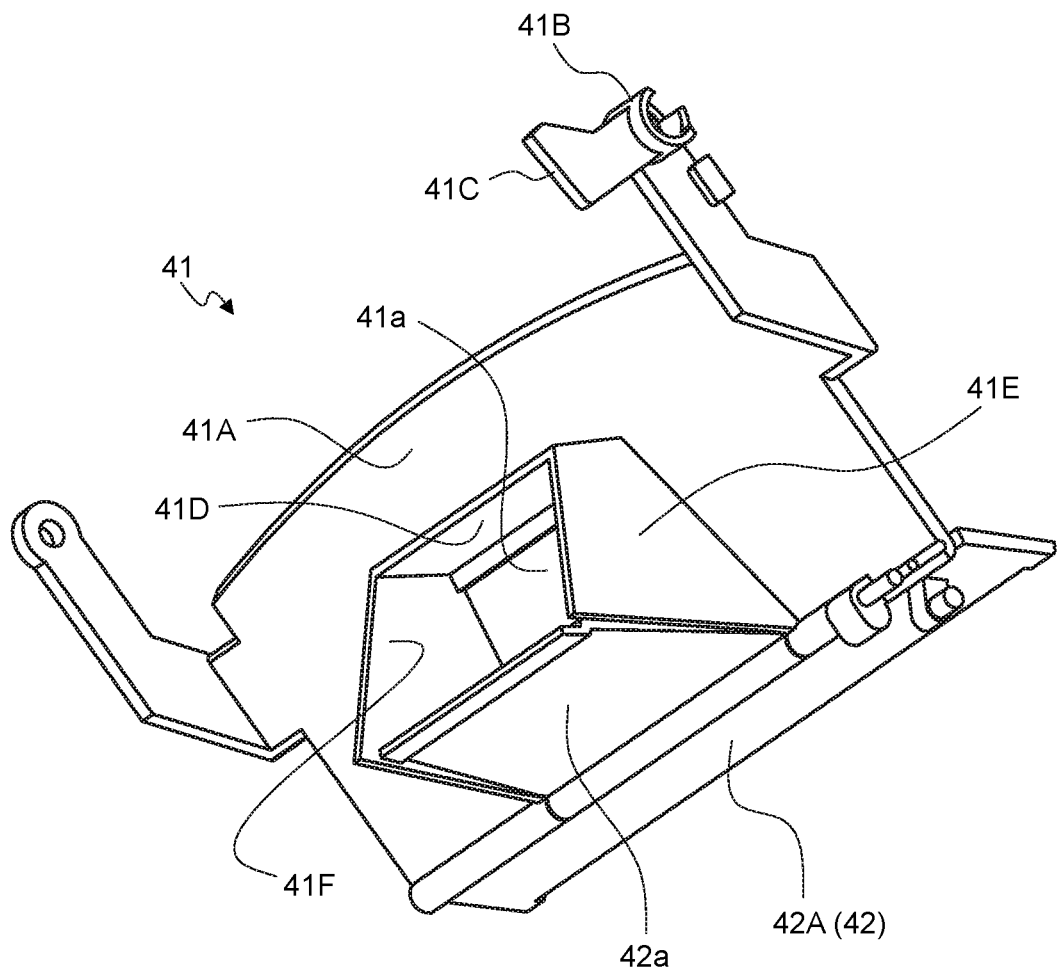

HEAD-UP DISPLAY SYSTEM

CROSS-REFERENCE TO RELATED APPLICATION(S)

The present application claims priority to and incorporates by reference the entire contents of Japanese Patent Application No. 2016-098796 filed in Japan on May 17, 2016.

BACKGROUND OF THE INVENTION

1. Field of the Invention

The present invention relates to a head-up display system.

2. Description of the Related Art

Conventionally, as a head-up display system, a head-up display system having a system configuration including a combiner is known (refer to Japanese Patent Application Laid-Open No. 2015-6832, Japanese translation of PCT international Application Publication No. 2014-520698, and Japanese Patent Application Laid-Open No. H11-72742). The combiner transmits projection light of a display image, which is projected, and displays a virtual image of the display image, which can be confirmed by a user with an eye, on a transmission destination in a state of overlapping, for example, a landscape in front of a vehicle. Accordingly, in this kind of head-up display system, in order to project the projection light of the display image that is formed at the inside of a housing to the combiner at the outside of the housing, an opening is provided in the housing. On the other hand, in the head-up display system, a lid body, which covers the opening, is provided so as to suppress intrusion of dust into the housing in non-use. Note that, in a head-up display system disclosed in Japanese Patent Application Laid-Open No. H11-72742, a combiner itself is used as a lid body in non-use, and thus there is a possibility that the combiner in non-use may come into notice depending on a color of a dashboard and the like.

By the way, in this kind of head-up display system, a masking member for optical path regulation, through which projection light necessary for formation of a virtual image of the display image, of projection light of the display image from an image-forming section passes, is provided in the housing and in a region ranging from the image-forming section to the combiner in use. Accordingly, in the conventional head-up display system, the lid body and the masking member are prepared as individual components so as to realize respective arrangements of the lid body and the masking member in use and in non-use.

SUMMARY OF THE INVENTION

An object of the present invention is therefore to provide a head-up display system capable of reducing the number of components.

In order to achieve the above mentioned object, a head-up display system according to one aspect of the present invention includes an image-forming and projection device that forms a display image, and projects projection light of the display image that is formed, a combiner that allows the projection light of the display image, which is projected from the image-forming and projection device in a case of being disposed at an in-use position, to be transmitted through the combiner, and forms a virtual image of the display image, which is capable of being confirmed by a user with an eye, at a transmission destination, housing that includes an opening through which the projection light of the display image from the image-forming and projection device passes to reach the combiner in use, and accommodates the image-forming and projection device and the combiner in non-use in an inner side, a first drive device that drives the combiner between a non-use position at which the combiner is accommodated in an inner side of the housing, and the in-use position at which the combiner is erected on an outer side of the housing, a lid body that covers the opening in non-use of the combiner, and accommodates the combiner in an inner side of the housing in use of the combiner and opens the opening, and a second drive device that drives the lid body between a position at which the lid body covers the opening, and a position at which the lid body opens the opening, wherein the lid body includes at least a first divided lid body and a second divided lid body which engage with each other at the time of covering the opening, the first divided lid body includes an optical path regulator that regulates an optical path of the projection light of the display image projected from the image-forming and projection device in use of the combiner on an inner side of the housing, and allows the projection light, which is necessary for formation of the virtual image of the display image in the projection light of the display image, to pass through the optical path regulator, and the second divided lid body includes a covering member that covers the optical path regulator at the time of covering the opening.

According to another aspect of the present invention in the head-up display system, the image-forming and projection device may include an image-forming section that forms the display image on the combiner side in use, and a reflection section that is disposed on a further user side in comparison to the image-forming section, reflects first the projection light of the display image projected from the image-forming section, and projects the reflected light, as second projection light of the display image, to the combiner in use through the opening, and the first divided lid body in use of the combiner is moved between the image-forming section and the reflection section to allow the first projection light, which is necessary for formation of the virtual image of the display image of the first projection light of the display image projected from the image-forming section, to pass through the optical path regulator, and to project the first projection light of the display image after the passing to the reflection section.

According to still another aspect of the present invention, in in the head-up display system, the lid body in use of the combiner may include a wall portion that surrounds an optical path of the first projection light of the display image in a region ranging from the image-forming section to the optical path regulator so as not to interrupt passing of the first projection light of the display image, which is projected from the image-forming section, through the optical path regulator.

According to still another aspect of the present invention, in in the head-up display system, the second divided lid body may be disposed on a further user side in comparison to the first divided lid body, at an end side opposite to the user side, the first divided lid body may be provided with a rotating shaft with respect to the housing along a longitudinal direction of the end on the opposite side, the opening may include an exit and entrance through which the combiner goes in and out and which is provided between the opening and the end on the opposite side in the first divided lid body, and the lid body may include a third divided lid body that covers the exit and entrance in non-use of the combiner, and opens the exit and entrance in use of the combiner.

According to still another aspect of the present invention, in the head-up display system, the first drive device and the second drive device may include a drive source that is common to the first drive device and the second drive device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a perspective view illustrating the first and second divided lid bodies in use.

DETAILED DESCRIPTION OF THE PREFERRED EMBODIMENTS

Hereinafter, an embodiment of a head-up display system according to the present invention will be described in detail with reference to the accompanying drawings. Note that the invention is not limited by the embodiment.

Embodiment

An embodiment of the head-up display system according to the present invention will be described with reference to FIG. 1 to FIG. 9.

Figure 1:
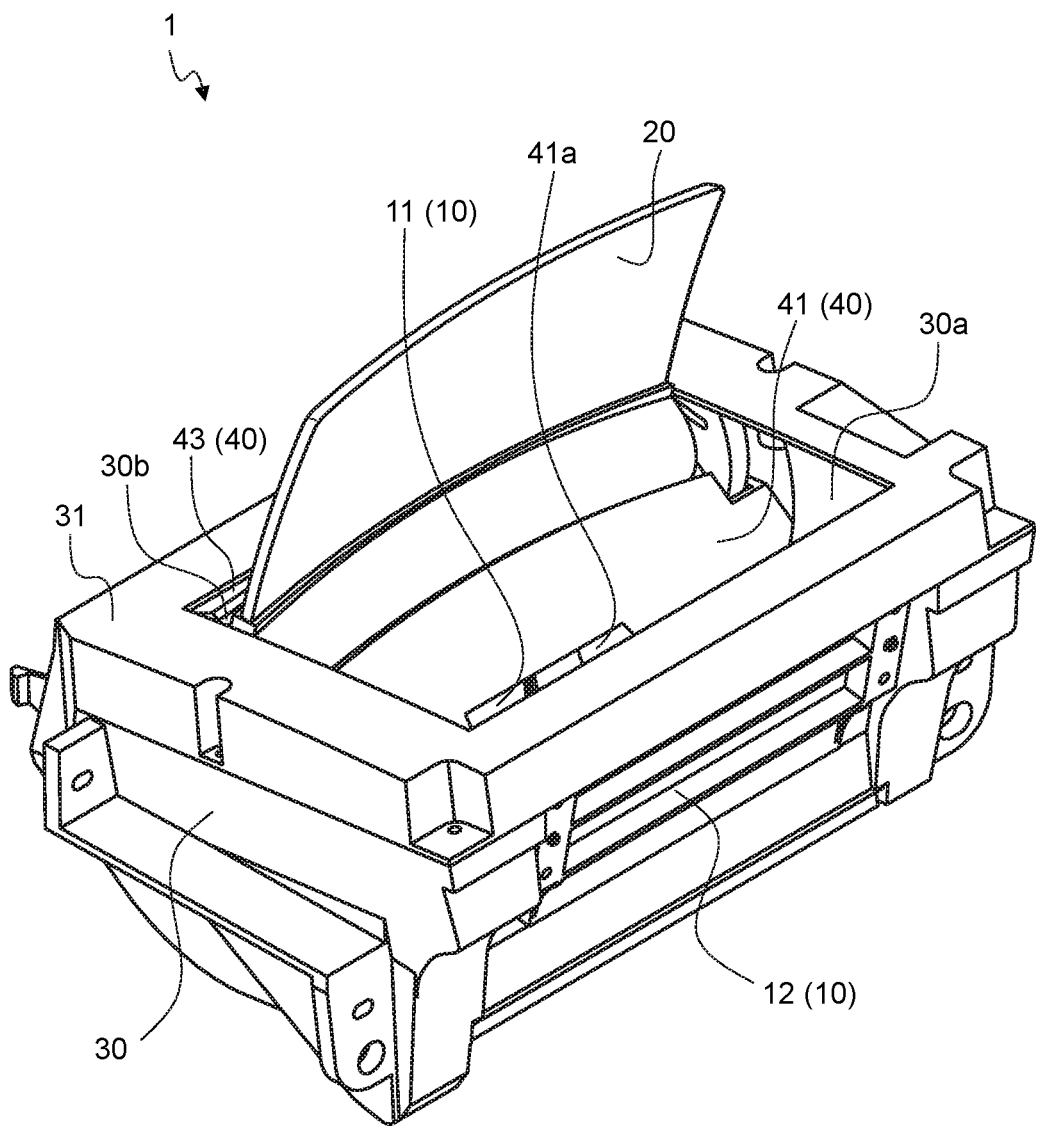
FIG. 1 is a perspective view illustrating a head-up display system of an embodiment in use.
Figure 2:
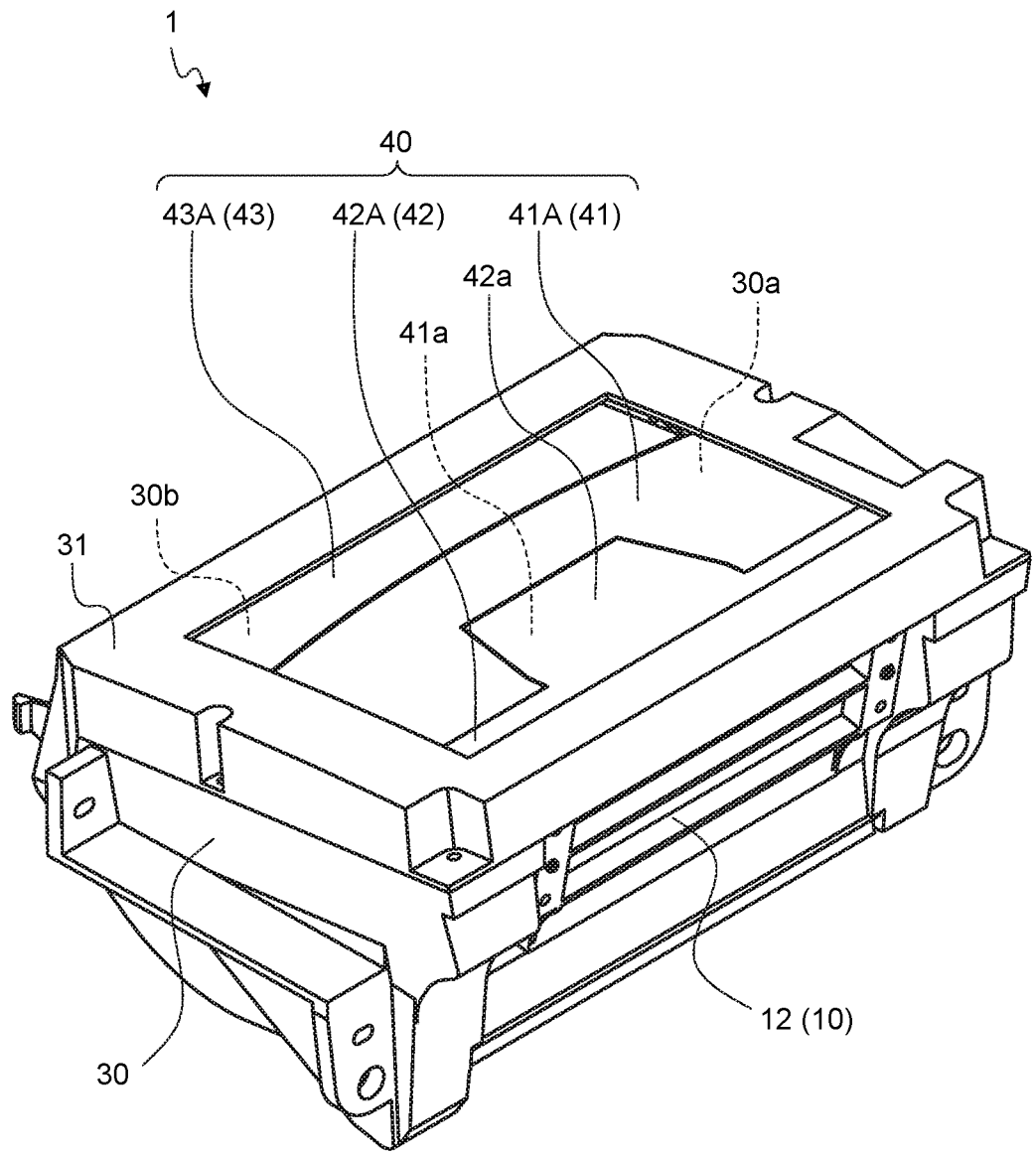
FIG. 2 is a perspective view illustrating the head-up display system of the embodiment in non-use.

A reference numeral 1 in FIG. 1 and FIG. 2 indicates the head-up display system of this embodiment. For example, the head-up display system 1 is disposed in a vehicle, and displays provision information such as vehicle information (vehicle velocity and the like), drive supporting information (guide information of a car navigation system) so as to provide the provision information to a user such as a driver in the vehicle. The provision information is displayed as a display image such as a character, a figure, an image, a video. For example, the head-up display system 1 is embedded in a dashboard (not illustrated) that exists between the driver and a windshield (so-called window screen) in a state in which an upper portion of the head-up display system is exposed.

The head-up display system 1 includes an image-forming and projection device 10, a combiner 20, a housing 30, and a lid body 40 (refer to FIG. 1 to FIG. 4). First, configurations of the components will be described in brief.

The image-forming and projection device 10 is a device that forms a display image related to provision information, and projects projection light of the display image that is formed. The image-forming and projection device 10 projects the projection light of the display image toward the combiner 20 that is disposed at a position in use. For example, the image-forming and projection device 10 may include an image-forming section that forms the display image, and a reflection section that reflects the projection light of the display image that is projected from the image-forming section, and projects the reflected light toward the combiner 20 in use. In this kind of image-forming and projection device 10, the image-forming section is disposed on a combiner 20 side in use, and the reflection section is disposed on a further user side in comparison to the image-forming section or the combiner 20 in use. In addition, the image-forming and projection device 10 may be a laser projector that directly projects the projection light of the display image that is formed toward the combiner 20, and the like. This kind of image-forming and projection device 10 is disposed on a further user side in comparison to a position of the combiner 20 in use.

Here, the term, "in use" represents time when display of the display image is possible or when the display image is displayed (FIG. 1). As described later, in use, the combiner 20 is erected on an outer side of the housing 30, and an opening 30a of the housing 30 is opened in accordance with movement of the lid body 40. On the other hand, the term, "in non-use" represents time when display of the display image is impossible (FIG. 2). In non-use, as described later, the combiner 20 is accommodated in an inner side of the housing 30, and the opening 30a of the housing 30 is covered with the lid body 40. Furthermore, in the head-up display system 1, in a state in which the combiner 20 is erected on the outer side of the housing 30, and even when the image-forming and projection device 10 does not form the display image, the combiner 20 may be set to a non-use state. However, definition of "in non-use" does not include a non-use state when the combiner 20 is erected on the outer side of the housing 30.

In a case of being disposed at a position in use, the combiner 20 allows the projection light of the display image, which is projected from the image-forming and projection device 10, to be transmitted therethrough, and can form a virtual image of the display image, which can be confirmed by a user with an eye, on a transmission destination. For example, the combiner 20 is a concave mirror that is constituted by a half mirror. In use, a convex side of the combiner 20 is allowed to face a front glass to display the virtual image of the display image in an enlarged manner. The combiner 20 is accommodated in an inner side of the housing 30 in non-use, and is erected on an outer side of the housing 30 in use. Accordingly, in the head-up display system 1, a first drive device, which drives the combiner 20 between a non-use position at which the combiner 20 is accommodated in the inner side of the housing 30, and an in-use position at which the combiner 20 is erected on the outer side of the housing 30.

The housing 30 accommodates the image-forming and projection device 10 and the combiner 20 in non-use in an inner side thereof, and is embedded in a dashboard in a state in which an upper portion 31 is exposed to a vehicle upper side. The first drive device is also accommodated on the inner side of the housing 30. The opening 30a, through which the projection light of the display image from the image-forming and projection device 10 passes to reach the combiner 20 at the in-use position (hereinafter, referred to as "combiner 20 in use), is formed on an upper portion 31 of the housing 30. In the housing 30, it is preferable that at least a portion exposed from the dashboard has the same color as the dashboard.

The lid body 40 covers the opening 30a of the housing 30 in non-use of the combiner 20, and accommodates the combiner 20 in the inner side of the housing 30 in use of the combiner 20 and opens the opening 30a. The lid body 40 suppresses intrusion of dust into the inner side of the housing 30 in non-use. It is preferable that at least a portion of the lid body 40, which is exposed from the dashboard, has the same color as the dashboard. In the head-up display system 1, a second drive device, which drives the lid body 40, is provided between a position at which the lid body 40 covers the opening 30a and a position at which the lid body 40 opens the opening 30a. The lid body 40 is constituted by a plurality of divided parts. The lid body 40 includes at least a first divided lid body 41 and a second divided lid body 42 which engage with each other when the opening 30a is covered.

An optical path regulator 41a for the projection light of the display image is formed in the first divided lid body 41. The optical path regulator 41a regulates an optical path of the projection light of the display image that is projected from the image-forming and projection device 10 in use of the combiner 20 (that is, when being accommodated on the inner side of the housing 30). The optical path regulator 41a regulates the optical path in the inner side of the housing 30 to allow the projection light, which is necessary for formation of a virtual image of the display image through the combiner 20, of the projection light of the display image projected from the image-forming and projection device 10, to pass therethrough. The transmitted projection light of the display image reaches the combiner 20 in use through the opening 30a.

The second divided lid body 42 includes a covering member 42a that covers the optical path regulator 41a when the opening 30a is covered. The second divided lid body 42 accommodates the combiner 20 in use in the inner side of the housing 30 in combination with the first divided lid body 41.

As described above, in the head-up display system 1, the first divided lid body 41 can be configured to play a role of covering the opening 30a in non-use of the combiner 20, and can be allowed to function as a masking member, which regulates the optical path of the projection light of the display image projected from the image-forming and projection device 10, in use of the combiner 20. Accordingly, in the head-up display system 1, it is not necessary to prepare the lid body 40 and the masking member as individual components, and thus it is possible to reduce the number of components. In addition, the first divided lid body 41 and the second divided lid body 42 play a role of covering the opening 30a in non-use of the combiner 20, and accommodates the combiner 20 in use on the inner side of the housing 30 from a covered position of the opening 30a. According to this, the optical path of the projection light of the display image which is projected from the image-forming and projection device 10, with the optical path regulator 41a, and realizes the projection of the projection light of the display image, which passes through the optical path regulator 41a, onto the combiner 20. Accordingly, the head-up display system 1 can suppress an increase in size, and thus it is also possible to improve mountability on a vehicle.

Hereinafter, a specific example of the head-up display system 1 in this embodiment will be described.

The head-up display system 1, which is exemplified here is provided with the image-forming and projection device 10 including the image-forming section and the reflection section.

First, description will be given of the image-forming and projection device 10 in this example. This kind of image-forming and projection device 10 is known in this technical field, and a configuration thereof will be described in brief. A reference numeral 11 in FIG. 1, FIG. 3, and FIG. 4 indicates the image-forming section of the image-forming and projection device 10. In addition, a reference numeral 12 in the same drawings indicates the reflection section of the image-forming and projection device 10.

Figure 3:
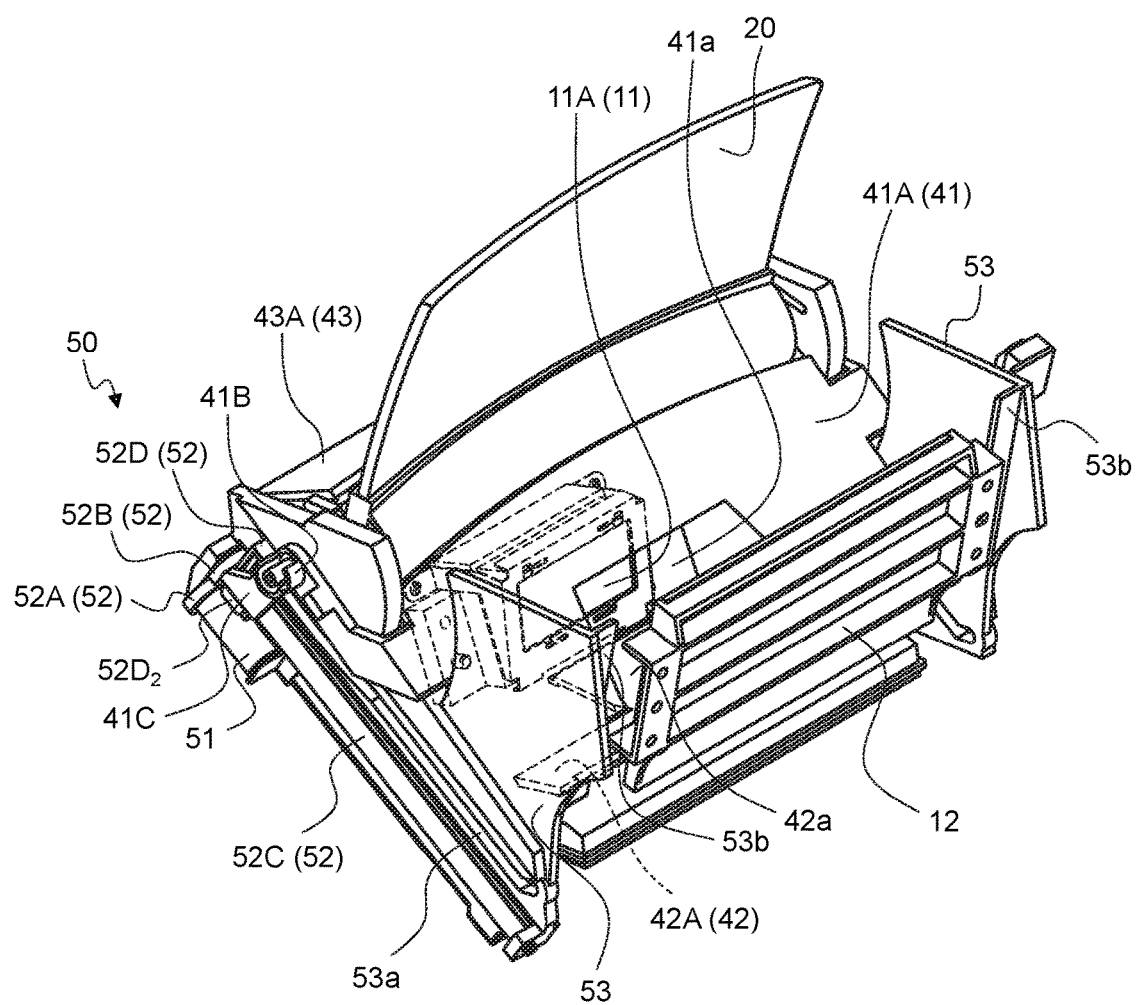
FIG. 3 is a perspective view illustrating an inner structure of the head-up display system of the embodiment in use in a partial see-through manner.
Figure 4:
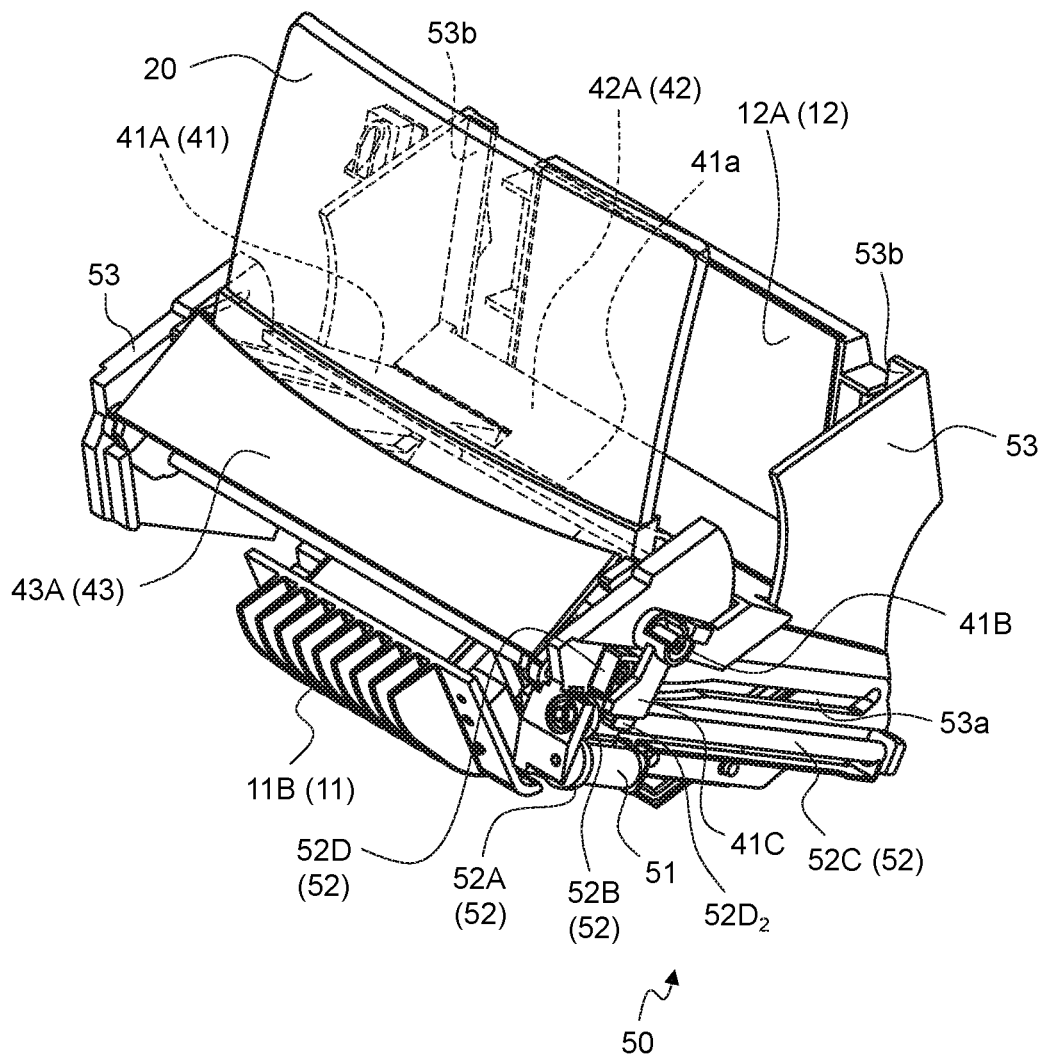
FIG. 4 is a perspective view illustrating an inner structure of the head-up display system of the embodiment in use in a partial see-through manner at another angle.

As described above, the image-forming section 11 forms the display image on a combiner 20 side in use. As the image-forming section 11, a display device, which includes a display member 11A as a display screen of the display image that is formed, is used (FIG. 3). For example, as the image-forming section 11, a so-called liquid crystal display device including a rectangular display member 11A as a liquid crystal screen, and the like can be used. Accordingly, the image-forming section 11 in this example includes a light source 11B such as a backlight (FIG. 4). The display member 11A is disposed in a configuration capable of projecting the first projection light of the display image, which is displayed thereon, toward the reflection section 12. In addition, as the image-forming section 11, a laser projector and the like may be used.

The reflection section 12 is disposed on a further user side in comparison to the image-forming section 11, and reflects the first projection light of the display image, which is projected from the display member 11A of the image-forming section 11, to project the reflected light, as the second projection light, to the combiner 20 in use through the rectangular opening 30a of the housing 30. The reflection section 12 is provided with a reflection mirror 12A that is constituted by a planar mirror (FIG. 4).

The combiner 20 is a concave mirror that is molded in a rectangular shape. When the combiner 20 is moved from a non-use position at which the combiner 20 is accommodated in the inner side of the housing 30, and is lifted from the opening 30a, the combiner 20 is erected on an outer side of the housing 30 at an in-use position. The combiner 20 is in and out of an end of the opening 30a at a side opposite to a user (that is, on a windshield side).

The lid body 40 that covers the opening 30a is constituted by the first divided lid body 41, the second divided lid body 42, and a third divided lid body 43 (FIG. 2). In the lid body 40 in this example, the user side in the opening 30a is covered with the second divided lid body 42, a side opposite to the user side in the opening 30a is covered with the third divided lid body 43, and a gap between the second divided lid body 42 and the third divided lid body 43 is covered with the first divided lid body 41. It is preferable that the lid body 40 has a color that suppresses glare to the reflection mirror 12A.

The first divided lid body 41 is formed in a shape having a U-shaped flat portion 41A (FIG. 2 to FIG. 4). In the first divided lid body 41, the U-shaped flat portion 41A is used to cover the opening 30a, and a rectangular space portion on an inner side of the U-shape is used as the optical path regulator 41a. The first divided lid body 41 is disposed in such a manner that the U-shaped opening faces a second divided lid body 42 side (that is, an end side on the user side in the opening 30a) at the time of covering the opening 30a (FIG. 2).

On an end side opposite to the user side at the time of covering the opening 30a, the first divided lid body 41 is provided with a rotating shaft 41B with respect to the housing 30 along a longitudinal direction of the end on the opposite side (FIG. 3 and FIG. 4). The first divided lid body 41 rotates around the rotating shaft 41B with respect to the housing 30, and displaces between a position at the time of covering the opening 30a and an accommodation position on the inner side of the housing 30 in use of the combiner 20. The accommodation position is a predetermined position between the display member 11A of the image-forming section 11, and the reflection mirror 12A of the reflection section 12 (that is, on an optical path of the first projection light of the display image), and is a position capable of allowing predetermined light of the first projection light of the display image, which is projected from the display member 11A, to pass through the optical path regulator 41a. Here, the first divided lid body 41 in use of the combiner 20 is moved between the display member 11A and the reflection mirror 12A to allow a light necessary for formation of a virtual image of the display image in the first projection light of the display image, which is projected from the display member 11A of the image-forming section 11, to pass through the optical path regulator 41a, and to project the first projection light of the display image after passage to the reflection mirror 12A of the reflection section 12. According to this, the first divided lid body 41 in use can block light, which does not reach the reflection mirror 12A (light that is diffused to the periphery), in the first projection light of the display image that is projected from the display member 11A. Consequently, the light is not leaked to the outside of the housing 30.

The second divided lid body 42 is formed in a shape having a convex flat plate portion 42A (FIG. 2). In the second divided lid body 42, the flat plate portion 42A is used to cover the opening 30a. At this time, in the second divided lid body 42, a protrusion in the convex shape is used as a covering member 42a for the optical path regulator 41a. The second divided lid body 42 is displaced between a position at the time of covering the opening 30a and an accommodation position on the inner side of the housing 30 in use of the combiner 20. The accommodation position is a position that does not obstruct formation of a virtual image of the display image. The second divided lid body 42 in this example is moved to a lower side in comparison to the optical path of the first projection light of the display image between the display member 11A and the reflection mirror 12A in use of the combiner 20.

The third divided lid body 43 is formed in a shape having a rectangular flat plate portion 43A (FIG. 2). In the third divided lid body 43, the flat plate portion 43A is used to cover the opening 30a. A rectangular region of the opening 30a, which is covered with the third divided lid body 43, is used as an exit and entrance 30b through which the combiner 20 goes in and out. In other words, the opening 30a includes the exit and entrance 30b, through which the combiner 20 goes in and out, between the opening 30a and an end of the first divided lid body 41 on a side opposite to the user side. The combiner 20 goes in and out through the exit and entrance 30b in conformity to a curved surface. The third divided lid body 43 covers the exit and entrance 30b in non-use of the combiner 20, and opens the exit and entrance 30b in use of the combiner 20. The third divided lid body 43 is retreated to a predetermined position, at which going in and out of the combiner 20 is not interrupted, in use of the combiner 20. When the third divided lid body 43 of this example is moved to a direction to be spaced away from a user, and a partial portion thereof is accommodated in the inner side of the housing 30, the exit and entrance 30b corresponding to only a region, through which the combiner 20 can go in and out, is exposed (FIG. 1).

Figure 5:
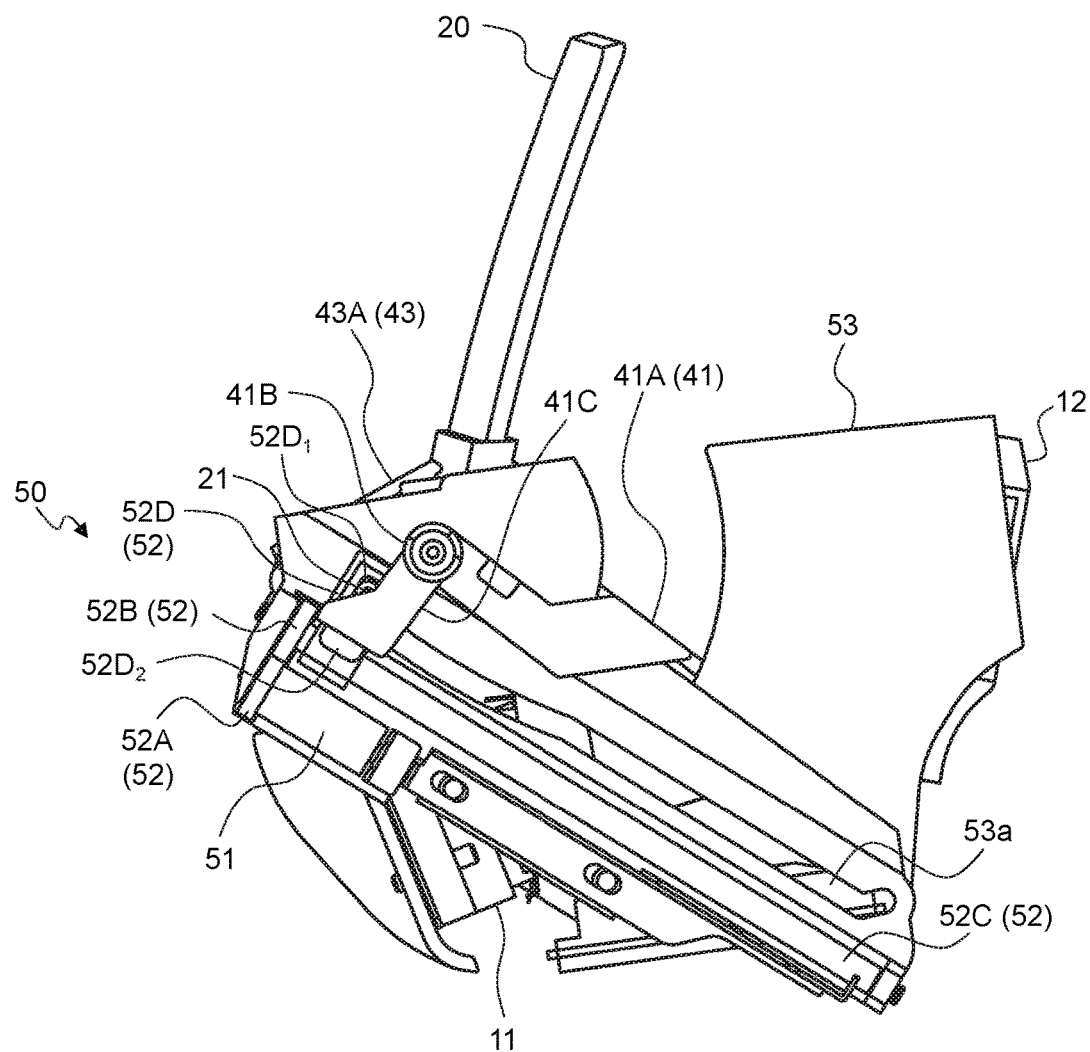
FIG. 5 is a side view illustrating an inner structure of the head-up display system of the embodiment in use.
Figure 6:
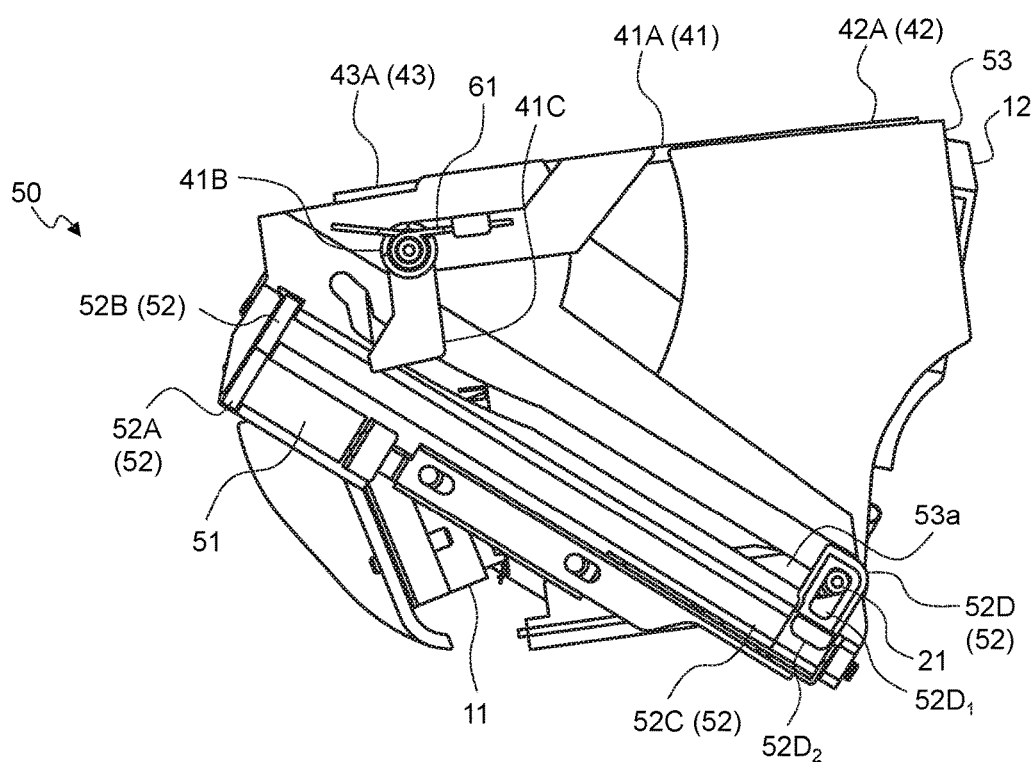
FIG. 6 is a side view illustrating an inner structure of the head-up display system of the embodiment in non-use.

The first drive device that drives the combiner 20 and the second drive device that drives the lid body 40 may have an arbitrary configuration as long as the above-described displacement is realized. In this example, the first drive device and the second drive device are configured to have a drive source that is common to the first drive device and the second drive device. The head-up display system 1 of this example includes a drive device 50 on an inner side of the housing 30 (FIG. 5, FIG. 6, and the like). In the drive device 50, the first drive device and the second drive device are collectively configured, and the drive device 50 is controlled by a control device (not illustrated).

The drive device 50 includes a drive source 51 such as an electric motor, and a power transmission unit 52 that transmits power of the drive source 51. The power transmission unit 52 includes a first gear 52A and a second gear 52B which mesh with each other. The first gear 52A and the second gear 52B are spur gears. The first gear 52A rotates integrally with an output shaft of the drive source 51. The second gear 52B rotates in conjunction with the rotation of the first gear 52A. In addition, a guide shaft member 52C that is disposed concentrically with the second gear 52B and rotates integrally with the second gear 52B, and a guided member 52D that is guided along an axial direction of the guide shaft member 52C are provided in the power transmission unit 52. A male screw is threaded on an outer peripheral surface of the guide shaft member 52C. On the other hand, the guided member 52D includes a female screw that is screwed to the male screw. Accordingly, in the drive device 50, it possible to reciprocate the guided member 52D along the axial direction of the guide shaft member 52C through transmission of power of the drive source 51. In addition, the guided member 52D is disposed so that rotation around the axial line of the guide shaft member 52C is suppressed.

The guided member 52D rotatably maintains a rotating shaft 21 that is provided to one end (on a lower portion in use) of the combiner 20. A long hole $52D_1$, which rotatably maintains the rotating shaft 21, is formed in the guided member 52D. A guide plate 53, which individually maintains each end of the rotating shaft 21, is provided in the drive device 50. The guide plate 53 is fixed to the housing 30. The drive source 51 and the power transmission unit 52 are formed in the guide plate 53 on one side. A guide hole 53a, which guides the rotating shaft 21, is formed in the guide plate 53. The guide hole 53a extends in an axial direction of the guide shaft member 52C, and performs guiding of the rotating shaft 21 that moves in combination with the guided member 52D when the guided member 52D is guided along the guide shaft member 52C.

In non-use of the combiner 20, the guided member 52D is disposed at an end on a user side in the guide shaft member 52C, and the rotating shaft 21 is disposed at an end on a user side in the guide hole 53a. In addition, in use of the combiner 20, the guided member 52D is disposed at an end opposite to the user side in the guide shaft member 52C, and the rotating shaft 21 is disposed at an end opposite to the user side in the guide hole 53a. When the guided member 52D is moved from the non-use position to the in-use position, the rotating shaft 21 is moved from a non-use position to an in-use position, and the combiner 20 is lifted from the exit and entrance 30b while rotating around the rotating shaft 21. In addition, when the guided member 52D is moved from the use position to the non-use position, the rotating shaft 21 is moved from the use position to the non-use position, and the combiner 20 is accommodated on the inner side of the housing 30 from the exit and entrance 30b while rotating around the rotating shaft 21.

In addition, a protrusion 52D$_2$ is also formed in the guided member 52D. Here, the first divided lid body 41 includes an extension portion 41C that extends from the rotating shaft 41B. The extension portion 41C extends toward the guide shaft member 52C. When the guided member 52D is moved from the non-use position to the in-use position, the extension portion 41C is compressed by the protrusion 52D$_2$, and thus the first divided lid body 41 is accommodated to the accommodation position on the inner side of the housing 30. Here, with regard to the protrusion 52D$_2$ and the extension portion 41C, a shape or an arrangement thereof is determined so that the movement of the first divided lid body 41 is carried out. A spring member 61 (FIG. 6), which increases a compressive force (repulsive force) in accordance with compression of the protrusion 52D$_2$ against the extension portion 41C, is attached to the rotating shaft 41B. Accordingly, when the guided member 52D is moved from the in-use position toward the non-use position, and the compressive force of the protrusion 52D$_2$ against the extension portion 41C is released, the compressive force of the spring member 61 is released, and thus the first divided lid body 41 returns to the non-use position to cover the opening 30a.

Figure 7:
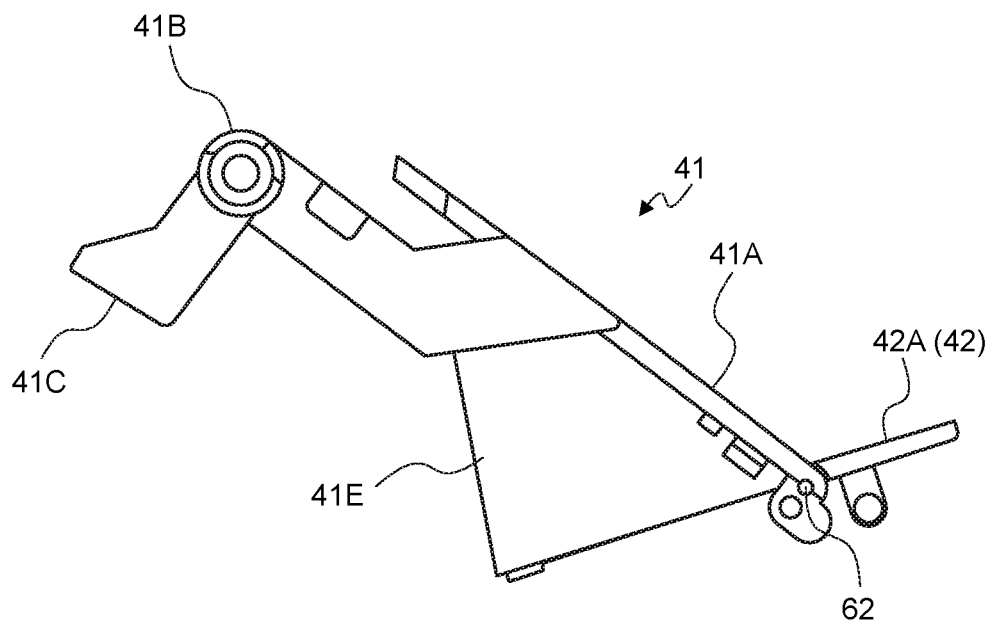
FIG. 7 is a side view illustrating first and second divided lid bodies in use.
Figure 8:
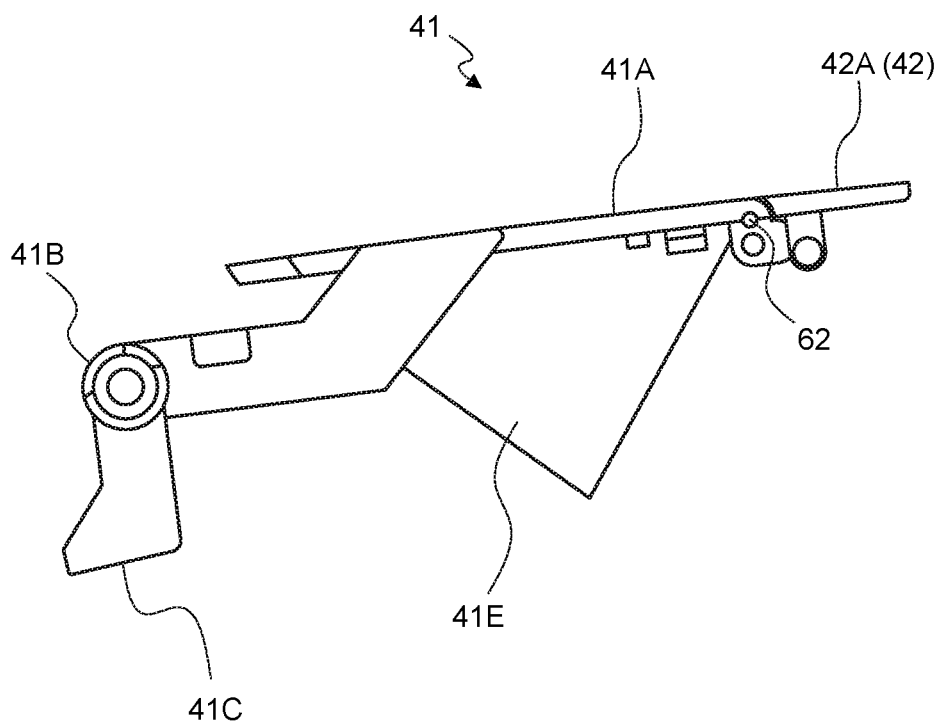
FIG. 8 is a side view illustrating the first and second divided lid bodies in non-use.

The first divided lid body 41 and the second divided lid body 42 are connected to each other through a rotating shaft 62 at ends facing each other (excluding ends facing each other between the optical path regulator 41a and the covering member 42a) (FIG. 7 and FIG. 8). The first divided lid body 41 and the second divided lid body 42 can perform relative rotation with respect to a counterpart of connected objects through the rotating shaft 62. Accordingly, the second divided lid body 42 is moved in conjunction with an accommodation operation of the first divided lid body 41 toward the inner side of the housing 30, and is lowered to the accommodation position by the first divided lid body 41 while performing relative rotation with respect to the first divided lid body 41 around the rotating shaft 62. A guide wall 53b, which guides the operation of lowering the second divided lid body 42, is provided in the guide plate 53 (FIG. 3 and FIG. 4). In addition, the second divided lid body 42 moves in conjunction with a returning operation of the first divided lid body 41 from the non-use position to the in-use position, and is raised to the original position by the first divided lid body 41 while performing relative rotation with respect to the first divided lid body 41 around the rotating shaft 62. According to this, the second divided lid body 42 returns to the non-use position to cover the opening 30a.

For example, when the combiner 20 is lifted, the third divided lid body 43 is compressed against the combiner 20 and is retreated to a predetermined position. In this case, a portion, which serves for compression of the third divided lid body 43 or locking of the third divided lid body 43 at a predetermined position, may be formed in the combiner 20. In addition, for example, a spring member (not illustrated), which increases a compressive force (repulsive force) in accordance with retreating of the third divided lid body 43 to a predetermined position, is formed between the guide plate 53 and the third divided lid body 43. Accordingly, the compressive force of the spring member is released in combination with accommodation of the combiner 20 to the inner side of the housing 30, and thus the third divided lid body 43 returns to the non-use position and covers the exit and entrance 30b of the opening 30a.

As described above, the lid body 40 of this embodiment can cover the opening 30a of the housing 30 in non-use of the combiner 20 by the first to third divided lid body 41, 42, and 43. In addition, the lid body 40 of this embodiment can appropriately regulate the optical path of the first projection light of the display image, which is projected from the display member 11A, by the first divided lid body 41. Accordingly, in the head-up display system 1 of this embodiment, a function of the masking member, which is prepared as a component different from the lid member in the related art, can be provided to the lid body 40. Accordingly, it is possible to reduce the number of components.

In the head-up display system of the related art, the lid body may be deviated to a virtual image side at the outside of the housing in use in order for the lid body and the masking member to coexist, or the lid body may be accommodated in the housing on the virtual image side in use. Therefore, there is a possibility that an increase in size may be caused. In contrast, in the head-up display system 1 of this embodiment, the first divided lid body 41 and the second divided lid body 42 are accommodated on the inner side of the housing 30, and thus formation of a virtual image of the display image can be formed. In addition, the third divided lid body 43 is accommodated on the inner side of the housing 30, and thus going in and out of the combiner 20 becomes possible between the inner side and the outer side of the housing 30. Here, the combiner 20 goes in and out through the exit and entrance 30b of the combiner 20 in a movement in conformity to the curved surface as described above, and thus it is possible to suppress the movement to a narrow region in the opening 30a. Accordingly, in this example, a decrease in size of the third divided lid body 43, which covers the exit and entrance 30b, becomes possible, and thus an increase in size of the housing 30 can be suppressed. As a result, in the head-up display system 1 of this embodiment, it is possible to suppress an increase in size in comparison to the related art, and mountability on a vehicle is also improved.

Here, it is preferable to provide a wall portion, which surrounds the optical path of the first projection light of the display image in a region ranging from the display member 11A of the image-forming section 11 to the optical path regulator 41a in use of the combiner 20, in the lid body 40. The wall portion is provided to avoid glare of other components which exist at the periphery of the optical path, and the like toward the reflection mirror 12A. The wall portion is disposed not to interrupt passing of the first projection light of the display image projected from the display member 11A through the optical path regulator 41a. For example, the wall portion is provided to the first divided lid body 41 and the second divided lid body 42, and the optical path is surrounded by four walls. For example, first to third wall portions 41D, 41E, and 41F, which are erected from a peripheral edge of the optical path regulator 41a, are provided to the first divided lid body 41 (FIG. 9). An erection direction faces the inner side of the housing 30 in non-use of the combiner 20, and faces the display member 11A in use of the combiner 20. The first wall portion 41D is connected to each of the second and third wall portions 41E and 41F to surround the optical path of the first projection light of the display image. The first to third wall portions 41D, 41E, and 41F cover the optical path of the first projection light of the display image projected from the display member 11A from third directions, but cannot cover the remaining one direction. Here, the second and third wall portions 41E and 41F, which face each other, are extended to the rectangular covering member 42a in the second divided lid body 42 to cover a gap between the second wall portion 41E and the third wall portion 41F with the covering member 42a. According to this, the optical path is covered with the covering member 42a from the remaining one direction. Accordingly, the first to third wall portions 41D, 41E, and 41F, and the covering member 42a can surround the optical path of the first projection light of the display image projected from the display member 11A, and thus it is possible to suppress glare of other components, which exist at the periphery of the optical path, and the like toward the reflection mirror 12A. As a result, the head-up display system 1 of this embodiment can suppress formation of an unnecessary virtual image different from the display image.

In the head-up display system 1, the image-forming and projection device 10 itself may be configured as the above-described laser projector. In this case, for example, in the lid body 40 that covers the opening 30a having a rectangular shape, the first divided lid body 41 is disposed on a user side, and the second divided lid body 42 is disposed on a further front glass side in comparison to the first divided lid body 41.

In this case, as described in the example, the first divided lid body 41 is formed in a shape having a U-shaped flat plate portion, and the flat plate portion is used to cover the opening 30a, and a rectangular space portion on an inner side of the U-shape is used as the optical path regulator 41a. The first divided lid body 41 covers a user side (that is, an image-forming and projection device 10 side) in the opening 30a at the time of covering the opening 30a, and is disposed in such a manner that the U-shaped opening faces a second divided lid body 42 side (that is, in a direction opposite to the example described above) at the time of covering the opening 30a. At an end side on a user side of the opening 30a at the time of covering the opening 30a, the first divided lid body 41 is provided with a rotating shaft with respect to the housing 30 along a longitudinal direction of the end on the user side. The first divided lid body 41 rotates with respect to the housing 30 around the rotating shaft, and displaces between a position at the time of covering the opening 30a and an accommodation position on the inner side of the housing 30 in use of the combiner 20.

In addition, as described in the example, the second divided lid body 42 is formed in a shape having the convex flat plate portion, and the flat plate portion is used to cover the opening 30a. In the second divided lid body 42, the protrusion in the convex shape is used as the covering member 42a. The second divided lid body 42 is accommodated at a predetermined accommodation position, which does not interrupt formation of a virtual image of the display image, on the inner side of the housing 30 in use of the combiner 20. For example, at an end side opposite to the user side at the time of covering the opening 30a, the second divided lid body 42 is provided with the rotating shaft with respect to the housing 30 along a longitudinal direction of the end on the opposite side. In this case, the second divided lid body 42 rotates with respect to the housing 30 around the rotating shaft, and displaces between a position at the time of covering the opening 30a and a predetermined accommodation position on the inner side of the housing 30 in use of the combiner 20. In addition, as described in the example, the second divided lid body 42 may be moved downwardly from the opening 30a to a predetermined accommodation position in use of the combiner 20.

Even when the head-up display system 1 is configured as described above, it is possible to obtain the same effect as in the above-described example.

In the head-up display system according to the embodiment, the first divided lid body can be configured to play a role of covering the opening in non-use of the combiner, and can be configured to function as a masking member, which regulates an optical path of the projection light of the display image projected from the image-forming and projection device in use of the combiner. Accordingly, in the head-up display system, it is not necessary to prepare the lid body and the masking member as individual components, and thus it is possible to reduce the number of components.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display system, comprising:
   an image-forming and projection device that forms a display image, and projects projection light of the display image that is formed;
   a combiner that allows the projection light of the display image, which is projected from the image-forming and projection device in a case of being disposed at an in-use position, to be transmitted through the combiner, and forms a virtual image of the display image, which is capable of being confirmed by a user with an eye, at a transmission destination;
   a housing that includes an opening through which the projection light of the display image from the image-forming and projection device passes to reach the combiner in use, and accommodates the image-forming and projection device and the combiner in non-use in an inner side;
   a first drive device that drives the combiner between a non-use position at which the combiner is accommodated in an inner side of the housing, and the in-use position at which the combiner is erected on an outer side of the housing;
   a lid body that covers the opening in non-use of the combiner, and accommodates the combiner in an inner side of the housing in use of the combiner and opens the opening; and
   a second drive device that drives the lid body between a position at which the lid body covers the opening, and a position at which the lid body opens the opening, wherein
   the lid body includes at least a first divided lid body and a second divided lid body which engage with each other at a time of covering the opening,
   the first divided lid body moves in the inner side of the housing in use of the combiner, and includes an optical path regulator that regulates an optical path of the projection light of the display image projected from the image-forming and projection device in use of the combiner on an inner side of the housing, and allows projection light, which is necessary for formation of the virtual image of the display image in the projection light of the display image, to pass through the optical path regulator, and
   the second divided lid body includes a covering member that covers the optical path regulator at the time of covering the opening.

2. The head-up display system according to claim 1, wherein
   the image-forming and projection device includes an image-forming section that forms the display image on the combiner side in use, and a reflection section that is disposed on a further user side in comparison to the image-forming section, reflects first projection light of the display image projected from the image-forming section, and projects the reflected light, as second projection light of the display image, to the combiner in use through the opening, and the first divided lid body in use of the combiner is moved between the image-forming section and the reflection section to allow the first projection light, which is necessary for formation of the virtual image of the display image among the first projection light of the display image projected from the image-forming section, to pass through the optical path regulator, and to project the first projection light of the display image after the passing to the reflection section.

3. The head-up display system according to claim 2, wherein the lid body in use of the combiner includes a wall portion that surrounds an optical path of the first projection light of the display image in a region ranging from the image-forming section to the optical path regulator so as not to interrupt passing of the first projection light of the display image, which is projected from the image-forming section, through the optical path regulator.

4. The head-up display system according to claim 2, wherein the second divided lid body is disposed on a further user side in comparison to the first divided lid body, at an end side opposite to the user side, the first divided lid body is provided with a rotating shaft with respect to the housing along a longitudinal direction of the end on the opposite side, the opening includes an exit and entrance through which the combiner goes in and out and which is provided between the opening and the end on the opposite side in the first divided lid body, and the lid body includes a third divided lid body that covers the exit and entrance in non-use of the combiner, and opens the exit and entrance in use of the combiner.

5. The head-up display system according to claim 3, wherein the second divided lid body is disposed on a further user side in comparison to the first divided lid body, at an end side opposite to the user side, the first divided lid body is provided with a rotating shaft with respect to the housing along a longitudinal direction of the end on the opposite side, the opening includes an exit and entrance through which the combiner goes in and out and which is provided between the opening and the end on the opposite side in the first divided lid body, and the lid body includes a third divided lid body that covers the exit and entrance in non-use of the combiner, and opens the exit and entrance in use of the combiner.

6. The head-up display system according to claim 1, wherein the first drive device and the second drive device include a drive source that is common to the first drive device and the second drive device.

7. The head-up display system according to claim 2, wherein the first drive device and the second drive device include a drive source that is common to the first drive device and the second drive device.

8. The head-up display system according to claim 3, wherein the first drive device and the second drive device include a drive source that is common to the first drive device and the second drive device.

9. The head-up display system according to claim 4, wherein the first drive device and the second drive device include a drive source that is common to the first drive device and the second drive device.

10. The head-up display system according to claim 5, wherein the first drive device and the second drive device include a drive source that is common to the first drive device and the second drive device.

11. The head-up display system according to claim 1, wherein the first divided lid body and the second divided lid body are movable with respect to each other at a time when the first drive device drives the combiner between the non-use position and the in-use position.

12. The head-up display system according to claim 1, wherein the first divided lid body is formed in a shape having a U-shaped flat portion that functions as the optical path regulator.

* * * * *